US006964722B2

(12) United States Patent
Taylor et al.

(10) Patent No.: US 6,964,722 B2
(45) Date of Patent: Nov. 15, 2005

(54) METHOD FOR PRODUCING A WOOD SUBSTRATE HAVING AN IMAGE ON AT LEAST ONE SURFACE

(75) Inventors: Dene H. Taylor, New Hope, PA (US); Jon H. Hardesty, Dallas, TX (US); Evan R. Daniels, Dallas, TX (US)

(73) Assignee: Trio Industries Holdings, L.L.C., Dallas, TX (US)

( * ) Notice: Subject to any disclaimer, the term of this patent is extended or adjusted under 35 U.S.C. 154(b) by 43 days.

(21) Appl. No.: 10/213,768

(22) Filed: Aug. 7, 2002

(65) Prior Publication Data

US 2004/0026017 A1 Feb. 12, 2004

(51) Int. Cl.[7] .......................... B44C 1/17; B32B 31/12; B32B 31/20; B32B 31/22; B05D 3/10

(52) U.S. Cl. ....................... 156/230; 156/234; 156/237; 156/240; 156/247; 156/277; 156/289; 427/148; 427/502; 427/325; 428/40.1; 428/195.1; 428/914; 101/34

(58) Field of Search ................................ 156/230, 239, 156/240, 247, 277, 289, 234, 237; 427/146, 147, 148, 299, 302, 325; 428/40.1, 41.6, 41.8, 42.1, 195, 202, 203, 914; 101/33, 34, 41, 114, 215

(56) References Cited

U.S. PATENT DOCUMENTS 2,202,465 A * 5/1940 Pattison ........................ 101/41
3,221,648 A * 12/1965 Weiss ......................... 101/129
3,782,896 A 1/1974 Defago et al. .................. 8/2.5
3,829,286 A 8/1974 Anzai et al. ..................... 8/2.5
4,021,591 A * 5/1977 DeVries et al. ............. 156/230
4,058,644 A 11/1977 DeVries ....................... 428/200
4,059,471 A 11/1977 Haigh ........................ 156/244
4,118,264 A 10/1978 Boettcher ................... 156/238
4,171,202 A 10/1979 Sideman et al. ............. 8/2.5 A
4,202,663 A 5/1980 Haigh ........................... 8/471
4,238,190 A 12/1980 Rejto ............................ 8/471
4,388,137 A 6/1983 McCarty et al. ......... 156/275.5
4,395,263 A 7/1983 Davis ............................ 8/471
4,462,852 A 7/1984 Custor ........................ 156/231
4,465,728 A 8/1984 Haigh ........................ 428/156
4,520,062 A 5/1985 Ungar et al. ................ 428/148
4,576,610 A 3/1986 Donenfeld ...................... 8/471
4,596,190 A 6/1986 Hanstein et al. ............ 101/470
4,668,239 A 5/1987 Durand .......................... 8/471
4,678,528 A 7/1987 Smith et al. ................ 156/220
4,758,952 A 7/1988 Harris et al. ................ 364/300
4,771,687 A * 9/1988 Daunheimer ................. 101/44
4,842,613 A 6/1989 Purser ........................... 8/471

(Continued)

FOREIGN PATENT DOCUMENTS

EP 816122 * 1/1998 ............. B44C/1/17
GB 2212761 * 8/1989 ............ B41M/1/38

*Primary Examiner*—J. A. Lorengo
(74) *Attorney, Agent, or Firm*—Daniel T. Chalker; Chalker Flores, LLP

(57) ABSTRACT

A method and system is provided for producing an image on one or more surfaces of a wood or wood composite substrate by applying a receptor coat to at least the one or more surfaces of the substrate, transferring the image to the receptor coat using a variety of image transfer processes and applying a topcoat to the image and receptor coat. The system implements the above method using a series of stations and includes a series of platens connected together by a chain and a set of rollers that allow the substrate to travel through the stations on the platens. The resulting wood or wood composite product includes a substrate, a receptor coat disposed on one or more surfaces of the substrate, an image disposed on or within the one or more surfaces of the receptor coat and a top coat disposed on the image and receptor coat.

36 Claims, 4 Drawing Sheets

U.S. PATENT DOCUMENTS

| | | | | | |
|---|---|---|---|---|---|
| 5,032,139 | A | | 7/1991 | Recher et al. | 8/471 |
| 5,096,876 | A | | 3/1992 | Reiner et al. | 503/227 |
| 5,104,847 | A | | 4/1992 | Hann et al. | 503/227 |
| 5,142,722 | A | | 9/1992 | Kolb | 8/471 |
| 5,160,505 | A | | 11/1992 | Seveno et al. | 8/471 |
| 5,203,941 | A | | 4/1993 | Spain et al. | 8/471 |
| 5,297,143 | A | | 3/1994 | Fridrich et al. | 370/85.3 |
| 5,308,426 | A | | 5/1994 | Claveau | 156/234 |
| 5,364,412 | A | | 11/1994 | Furukawa | 8/471 |
| 5,376,149 | A | | 12/1994 | Defieuw et al. | 8/471 |
| 5,437,755 | A | | 8/1995 | Lavorel | 156/240 |
| 5,486,500 | A | | 1/1996 | Kaufman | 503/227 |
| 5,580,410 | A | * | 12/1996 | Johnston | 156/240 |
| 5,628,853 | A | | 5/1997 | Edwards | 156/212 |
| 5,643,387 | A | | 7/1997 | Berghauser et al. | 156/230 |
| 5,718,792 | A | | 2/1998 | Goode | 156/228 |
| 5,721,052 | A | | 2/1998 | Muthiah | 428/413 |
| 5,798,017 | A | | 8/1998 | Claveau | 156/382 |
| 5,856,267 | A | | 1/1999 | Sherman et al. | 503/227 |
| 5,868,801 | A | | 2/1999 | Lindh et al. | 8/471 |
| 5,869,138 | A | * | 2/1999 | Nishibori | 427/274 |
| 5,895,505 | A | | 4/1999 | Yamamoto | 8/471 |
| 5,935,661 | A | | 8/1999 | Biller et al. | 427/474 |
| 5,962,368 | A | | 10/1999 | Poole | 503/227 |
| 5,976,296 | A | * | 11/1999 | Sherman et al. | 156/230 |
| 5,985,416 | A | | 11/1999 | Sherman et al. | 428/195 |
| 5,989,380 | A | | 11/1999 | Frischer | 156/277 |
| 5,989,681 | A | * | 11/1999 | Martino | 428/151 |
| 5,994,264 | A | | 11/1999 | Sherman et al. | 503/227 |
| 5,997,677 | A | | 12/1999 | Zaher | 156/230 |
| 6,015,469 | A | | 1/2000 | Fenzi | 156/230 |
| 6,077,610 | A | | 6/2000 | Correll et al. | 428/413 |
| 6,110,316 | A | | 8/2000 | Kobayashi et al. | 156/230 |
| 6,136,126 | A | | 10/2000 | Fenzi | |
| 6,174,574 | B1 | | 1/2001 | Martino | 428/17 |
| 6,221,439 | B1 | | 4/2001 | Negele et al. | 427/514 |
| 6,280,820 | B1 | | 8/2001 | Martino | 428/151 |
| 6,281,166 | B1 | | 8/2001 | Kronzer | 503/227 |
| 6,300,279 | B1 | * | 10/2001 | Macedo | 503/227 |
| 6,332,941 | B1 | | 12/2001 | Council et al. | 156/230 |
| 6,333,369 | B1 | | 12/2001 | Park et al. | 523/454 |
| 6,335,749 | B1 | | 1/2002 | Carizzoni et al. | 347/171 |
| 6,340,504 | B1 | * | 1/2002 | Neumann et al. | 427/493 |
| 6,348,260 | B1 | | 2/2002 | Ogawa et al. | 428/327 |
| 6,350,792 | B1 | | 2/2002 | Smetana et al. | 522/81 |
| 6,386,698 | B2 | | 5/2002 | Suga et al. | 347/103 |
| 6,406,582 | B1 | | 6/2002 | Johansson et al. | 156/230 |
| 6,635,142 | B1 | | 10/2003 | Stula et al. | |
| 2003/0020767 | A1 | * | 1/2003 | Saksa | 347/2 |

* cited by examiner

METHOD FOR PRODUCING A WOOD SUBSTRATE HAVING AN IMAGE ON AT LEAST ONE SURFACE

TECHNICAL FIELD OF THE INVENTION

The present invention relates generally to the field of wood, wood composites, imaging on wood and wood composites, and coatings for wood and wood composites. More specifically, the present invention relates to a method and system for producing a wood or wood composite substrate having an image on at least one surface and the resulting wood or wood composite product.

BACKGROUND OF THE INVENTION

The diminished availability and high cost of hard woods for use as furniture or attractive building materials has proliferated the use of less expensive wood and wood composites. In many of these cases, the less expensive wood and wood composites are modified or finished such that they appear to be either natural wood or a specific hard wood. In other cases, a decorative image, logo or name is "printed" on the less expensive wood and wood composites. Alternatively, inexpensive wood composites are surfaced with colored or printed vinyl, phenolic-backed or similar decorative laminates, but these laminates all show edges and cracks or delaminate at these locations, and they are themselves costly. Each existing process used to create these wood or wood composite products has disadvantages and trade offs. For example, producing a high quality wood or wood composite product substantially increases plant and production costs while reducing throughput. Conversely, a lower cost wood or wood composite product produced at a higher throughput can be achieved by sacrificing quality and durability. These problems are compounded if the wood or wood composite product is non-planar.

There is, therefore, a need for a method and system that produce a high quality, durable and economical wood or wood composite substrate having an image on at least one surface. Moreover, there is a need for such a method and system to be implemented as a relatively high throughput production line process that will work with both planar and non-planar substrates and objects.

SUMMARY OF THE INVENTION

The present invention provides a method and system that produces a high quality, durable and economical wood or wood composite substrate having an image on at least one surface. In addition, this method and system can be implemented as a relatively high throughput production line process that will work with both planar and non-planar substrates and objects. Moreover, the present invention is applicable to a variety of coating processes, image transfer processes and types of image to be transferred. The specific coating and image transfer processes used are selected based on the type of image to be transferred and the specifications of the resulting wood or wood composite product. In all cases, the present invention provides improved reliability and registration of the image transfer. Inline processing also permits the imaging to be performed on partly cured or gel-stage coatings, which can boost production and image quality while simultaneously reducing costs.

More specifically, the present invention provides a method for producing an image on one or more surfaces of a wood or wood composite substrate by applying a receptor coat of powder to at least the one or more surfaces of the substrate, curing the powder to adhere to the substrate, transferring the image to the receptor coat and applying a topcoat to the image and receptor coat. Among other things, the substrate can be a panel, door, door front, door header, passage door, table top, counter top, tray, molding, banister, baluster, valance, flooring, display, signage, plywood cylinders, toys, shelving, picture frames, shudders, picture rails, furniture, boards for ready to assemble furniture, cabinet, cabinet box, pedestal, lectern, wall covering, panels and boards for construction, trim, decorative article, or any other wood product or object or part thereof. In addition, the one or more surfaces of the substrate can be substantially planar, or have a cross section that varies in one or two dimensions. The image can be transferred to the receptor coat using a dye sublimation process, ink transfer process, direct printing process, non-contact ink transfer process or lamination transfer process.

In addition, the present invention provides a method for producing an image on one or more surfaces of a wood or wood composite substrate by applying a receptor coat to at least the one or more surfaces of the substrate, bringing a transfer material containing the image to be transferred in contact with the receptor coat, transferring the image to the receptor coat by applying heat and pressure to the transfer material to cause the ink of the image to adhere to the receptor coat and applying a topcoat to the image and receptor coat.

Alternatively, the present invention provides a method for producing an image on one or more surfaces of a wood or wood composite substrate by applying a receptor coat to at least the one or more surfaces of the substrate, transferring the image to the receptor coat using a direct printing process and applying a topcoat to the image and receptor coat. A non-contact ink transfer process or lamination process can be used in place of the direct printing process.

Moreover, the present invention provides a system for producing an image on one or more surfaces of a wood or wood composite substrate. The system includes a receptor coating station that applies a receptor coat to at least the one or more surfaces of the substrate, an image transfer station that transfers the image to the receptor coat and a top coating station that applies a topcoat to the image and receptor coat. The system also includes a series of platens connected together by a chain and a set of rollers that allow the substrate to travel on one of the platens through the receptor coating station, the image transfer station and the top coating station.

The present invention also provides a wood or wood composite product that includes a wood or wood composite substrate, a receptor coat disposed on one or more surfaces of the substrate, an image disposed on or within the receptor coat and a top coat disposed on the image and receptor coat.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention.

The present invention provides a method and system that produces a high quality, durable and economical wood or wood composite substrate having an image on at least one surface. In addition, this method and system can be implemented as a relatively high throughput production line process. Moreover, the present invention is applicable to a variety of coating processes, image transfer processes and types of image to be transferred. The specific coating and image transfer processes used are selected based on the type of image to be transferred and the specifications of the resulting wood or wood composite product. In all cases, the present invention provides improved reliability and registration of the image transfer. Inline processing also permits the imaging to be performed on partly cured or gel-stage coatings.

Figure 1:
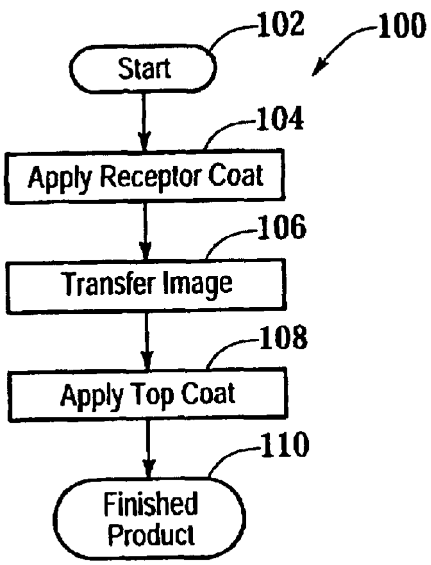
FIG. 1 illustrates an overall process for producing an image on one or more surfaces of a wood or wood composite substrate in accordance with the present invention.

Referring now to FIG. 1, an overall process 100 for producing an image on one or more surfaces of a wood or wood composite substrate in accordance with the present invention is shown. The process 100 begins in block 102 by providing a wood or wood composite substrate for processing. The wood or wood composite substrate may include Among other things, the substrate can be a panel, door, door front, door header, passage door, table top, counter top, tray, molding, banister, baluster, valance, flooring, display, signage, plywood cylinders, toys, shelving, picture frames, shudders, picture rails, furniture, boards for ready to assemble furniture, cabinet, cabinet box, pedestal, lectern, wall covering, panels and boards for construction, trim, decorative article, or any other wood product or object or part thereof. Moreover the one or more surfaces of the wood or wood composite substrate can be horizontal or vertical (planar or substantially planar), or vary in two dimensions (contoured, molded or profiled). A wood composite substrate may include any type of man-made boards of bonded wood sheets and/or lignocellulosic materials such as veneer, fiberboard, particleboard, hardboard, waferboard, cardboard, strandboard, plywood, or any combination of these materials.

A receptor coat is then applied to at least the one or more surfaces of the substrate in block 104. The receptor coat can be a clear or opaque coating and is used to ensure a quality image transfer to the substrate. Clear receptor coats can be applied using a powder, a radiation curable liquid or traditional solvent. The powder can be applied using various electrostatic processes. The application of powder coatings typically requires the sub-steps of preheating, coating, curing and cooling. The application of radiation curable liquid coating requires the sub-steps of coating and curing. The application of traditional solvent coatings typically requires the sub-steps of coating and drying. Opaque receptor coats can be applied using any of the following dual coat process: a liquid base coat followed by a clear coat; an opaque powder followed by a clear powder; an opaque radiation curable liquid followed by a clear powder; or an opaque radiation curable liquid followed by a clear radiation curable liquid. Opaque receptor coats may include white or colored pigments. In addition, opaque receptor coats can be applied using an integral pigmented coating of powder, radiation curable liquid or traditional solvent.

The material chosen for the receptor coat should exhibit a moderate surface tension allowing "wetting" of the substrate surface while subsequently allowing the ink/dye from the imaging process and the topcoat to "wet" the receptor coat. In addition the material should exhibit a sufficiently high glass transition temperature (Tg) to prevent flow during the imaging process and the topcoat curing process. Partial cure of the receptor coat may be acceptable if receptor coat material Tg is sufficiently high. For example, a material exhibiting a maximum Tg of 150° C. may be partially cured to a point at which the Tg measures 110° C. If the Tg of 110° C. is sufficiently high, then the time and energy saved by the reduction of 40° C. provides a cost savings. Further curing and subsequent processing can raise the hardness to that required in the end use.

Thereafter the image is transferred to the one or more surfaces of the substrate in block 106. The image transfer process may include dye sublimation, ink transfer, direct printing, non-contact printing or printing or preprinting saturated paper. These processes will described in more detail in relation to FIGS. 3A–3B, 4A–4C, 5–8 and 9A–9B. The transferred image can be any graphic, such as a picture, pattern or coloration, etc. The image transfer process can be a registered (all imaged parts are the same) or staggered (adjacent imaged parts vary) process. The ink or dye used to transfer the image to the wood or wood composite substrate should exhibit a surface tension lower than that of the receptor coat and higher than that of the intended topcoat. In other words, the ink should "wet" the receptor coat and the topcoat should "wet" the ink.

A topcoat is then applied to at least the one or more surfaces of the substrate in block 108 to provide the finished product in block 110. The topcoat may be applied using powder, radiation curable liquid, solvent or over-laminate. The topcoat should be transparent, non-yellowing, durable and provide sufficient adherence to the receptor layer. The topcoat may also have either a flat or glossy appearance. The material chosen for the topcoat should exhibit a sufficiently low surface tension to "wet" both the ink or dye laid down in the imaging process and those regions of the receptor coat that are not bearing ink or dye from the imaging process. In addition, the chosen material should exhibit acceptable adhesion to the ink or dye from the image transfer process and the receptor coat so that the topcoat will not "peel" or pull away from the ink or dye and the receptor coat. This is one factor in maintaining the high quality of the resulting product.

Alternatively, the topcoat may be chosen to be receptive to stain so that the final color of the imaged part can be selected at a later date. Such coating may then be separately over-coated with a durable clear top coating formulation. It would need to be sufficiently durable to withstand the rigors of stacking and transportation, but these are less than those contemplated for the topcoat in final use.

Proper cure conditions should be established for a through (100%) cure. Since the topcoat is used as a protective coating, it should exhibit maximal physical properties that are achieved only at advanced curing stages (i.e., highest possible molecular weights provide optimal mechanical properties). The material chosen should also be capable of providing the necessary tensile and compression strengths, mar and scratch resistance, etc. Moreover, appropriate film thickness should be established for the intended use of the resulting wood or wood composite product. A larger film thickness will be required for objects receiving extensive physical contact resulting in abrasion of the topcoat film. Appropriate application conditions for the topcoat can be established once the appropriate film thickness is established for the intended use of the wood or wood composite product.

Figure 2:
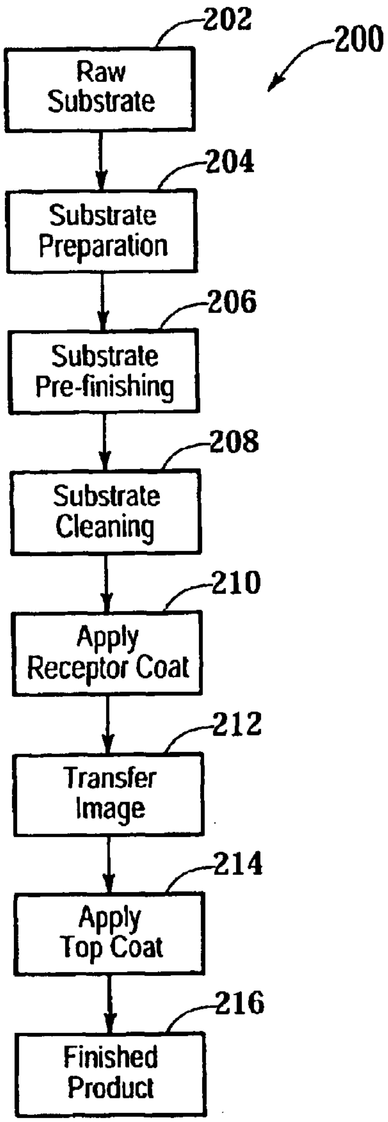
FIG. 2 illustrates a more detailed process for producing an image on one or more surfaces of a wood or wood composite substrate in accordance with the present invention.

Now referring to FIG. 2, a more detailed process 200 for producing an image on one or more surfaces of a wood or wood composite substrate in accordance with the present invention is shown. The raw wood or wood composite substrate 202 is prepared in block 204 and pre-finished in block 206. Substrate preparation 204 may include such things as shaping, edging, forming, routing, drilling, creating hardware recesses, sanding and/or cutting of the raw wood or wood composite substrate 202. Substrate pre-finishing may include such things as cleaning, polishing, sanding, sealing, staining and/or fillcoat/sanding. Note that sealing the wood or wood composite substrate 202 at this stage of the process can reduce the thickness required for the receptor coat. Depending on the substrate pre-finishing 206 performed, the substrate 202 is cleaned in block 208 by any typical process, such as brush, vacuum, air jets, ionized air, static bars or any combination thereof. Thereafter, a receptor coat is applied to one or more surfaces of the substrate in block 210. For example, the receptor coat can be applied to two sides of the wood or wood composite substrate 202 by sending it vertically through the coater to coat both sides in one booth. The ends and sides of the substrate 202 can also be coated during this process. Certain areas of the substrate 202 may require a "touch up" depending on how the substrate 202 is transported through the coater. Substrates in this orientation need to be coated by powder or spray, whereas horizontally oriented substrate may be coated also by roll or curtain methods.

As previously described, the receptor coat can be a clear or opaque coating and is used to ensure a quality image transfer to the substrate. Clear receptor coats can be applied using powder, a radiation curable liquid or traditional solvent. The powder can be applied using various electrostatic processes. The application of powder coatings typically requires the sub-steps of preheating, coating, curing and cooling. The application of radiation curable liquid coating requires the sub-steps of coating and curing. The application of traditional solvent coatings typically requires the sub-steps of coating and drying. Opaque receptor coats can be applied using any of the following dual coat process: a liquid base coat followed by a clear coat; an opaque powder followed by a clear powder; an opaque radiation curable liquid followed by a clear powder; or an opaque radiation curable liquid followed by a clear radiation curable liquid. Opaque receptor coats may include white or colored pigments. In addition, opaque receptor coats can be applied using an integral pigmented coating of powder, radiation curable solvent or traditional solvent.

The image is then transferred to the one or more surfaces of the substrate in block 212. The image transfer process may include dye sublimation, ink transfer, direct printing, non-contact printing or saturated paper. These processes will described in more detail in relation to FIGS. 3A–3B, 4A–4C, 5–8 and 9A–9B. The sequencing of the substrate 202 from the application of the receptor coat 210 to the image transfer process in 212 will vary depending on the type of image transfer process 212 used. For example, whenever a dye sublimation imaging process is used, such as is described below in reference to FIGS. 3A, 3B, 4A, 4B and 4C, the immediate sequencing of the image transfer process 212 (dye sublimation) immediately after receptor coating 210 takes advantage of the energy imparted into the substrate 202 by the drying or curing required in the receptor coating step 210. More specifically, a powder receptor coating process 210 typically raises the surface temperature of the substrate 202 to 250–350° F. and the UV cure can raise the temperature to 150 to 250° F. Note that the drying of conventional receptor coatings can produce a similar result. It is well known that dye sublimation transfer on hot substrates 202 proceeds more effectively than on cool substrates 202, and gives a crisper more uniform and higher density image in a shorter time, often at lower temperature and/or pressure. Hence, preheating is commonly practiced. As a result, the delivery of a hot part (substrate 202) from the receptor coating process 210 presents the substrate 202 in a preferred condition. Ink transfer can also benefit from the substrate 202 being at greater than ambient temperature, but to a lesser extent. There is little advantage for direct or non-contact printing, yet saturation may require this to suitably liquefy the saturating liquid.

The transferred image can be any graphic, such as a picture, pattern or coloration, etc. The image transfer process 212 can be a registered (all imaged parts are the same) or staggered (adjacent imaged parts vary) process. The reality of the appearance of an image or pattern can be enhanced when the surface is embossed with a like pattern. This is especially true with wood grains. Patterns can be readily embossed when the substrate surface is soft. This occurs in the present invention described herein when the coatings are either hot, and therefore soft, or when they are in the gel form. As a result, the final surface can be embossed with an embossing roll at the appropriate point in the process to produce a surface texture that compliments the transferred image.

Note that if substrates 202 imaged by dye sublimation are stacked one atop the other immediately after the image transfer process 212, there is often an offsetting or ghosting of the image on the face side to the rear side of the substrate 202. This effect can be minimized by either chilling the substrate 202 so that the dye is trapped in the solidified matrix, or by placing a barrier material such as thick Kraft paper between the freshly imaged substrates 202. Chilling is, therefore, an optional step, which may be added to the system 200. The final topcoat, though, when well cured serves a similar purpose. Indeed, its composition may be chosen so that it is not a good solvent for the dye and so it will serve to trap the dye at elevated temperatures, negating the need for a barrier or a chiller.

Accordingly, the topcoat is applied to at least the one or more surfaces of the substrate in block 214 to provide the finished product in block 216. The topcoat may be applied using powder, radiation curable liquid, solvent or overlaminate. The topcoat should be transparent, non-yellowing, durable and provide sufficient adherence to the receptor layer. The topcoat may also have either a flat or glossy appearance. The topcoat may contain UV light absorbing chemicals and anti-oxidants to protect itself and the underlying image from degradation.

The processes 100 and 200 can be implemented in a horizontal or vertical production line or combination of both. The horizontal production line can be implemented as a series of platens connected by a chain moving on rollers on a floor level track. The wood or wood composite substrates are laid flat on the platen. In one embodiment of a completely horizontal production line, the chain moves the platen and wood or wood composite substrate through the following stations:

| | |
|---|---|
| Step 1. | Loading |
| Step 2. | Cleaner |
| Step 3. | Pre-heater |
| Step 4. | Base coat application |
| Step 5. | Base coat cure |
| Step 6. | Image Transfer |
| Step 7. | Top coating |
| Step 8. | Final cure |
| Step 9. | Unloading |

Preferably, such production line will operate at a speed of approximately 50 feet per minute with the wood or wood composite substrates being spaced approximately 50 inches apart. The exact operating speed and spacing will depend on the coating and image transfer processes that are selected. Note that the present invention is also applicable to low speed production lines often used to produce specialty or single unit products.

As previously stated, the image transfer process 212 may include any of the following processes: dye-sublimation transfer; ink or toner transfer; lamination of a saturating (porous) printed paper; direct printing (e.g., flexography, gravure or letterpress); or non-contact printing (e.g., inkjet). For each imaging process 212 there are a large number of factors to take into account when designing the process and developing the materials. Some of these factors include: surface temperature during the imaging step; gel degree of cure at the imaging step; base and top coating formulation; residence time for transfer; pressure during transfer or imaging; ink composition; carrier paper properties; printing process for the transfer material; composition and properties of the saturating printed paper; orientation of the wood or wood composite substrate; support and registration of the wood or wood composite substrate; yield and scrap propensity; number of surfaces to be imaged; and productivity. The differences of these imaging processes are further illustrated in the following table:

| Imaging Process | Dye Sublimation | Ink Transfer | Direct Contact | Non-Contact |
|---|---|---|---|---|
| Receptor | | | | |
| Chemistry | Polyester, Polyamide | Wide Variety | Wide Variety | Wide Variety |
| Surface Properties | Smooth Solid | Moderately Smooth Solid | Smooth Solid | Any |
| Temperature | Very Hot | Moderately Hot | Ambient to Warm | Ambient |
| Donor (Image Carrier) | Paper or Flexible film with disperse dye image Hard Backing | Paper with Ink Compliant Backing Backing | Print Roll | Print Head |
| Process Control | | | | |
| Time | 30 sec. (5 to 100 sec.) | 0.1 sec. | 0.1 sec. | Varies |
| Temperature | 200° C. (150° C. to 200° C.) | 100° C. to 150° C. | Ambient | Ambient |
| Pressure | 20 psi (1 to 500 psi) | 10 pli | Low | None |
| Other Steps | Separate Paper | Separate Paper | Dry | Dry |
| Issues | Relatively Slow Uniform Contact | Fragile Transfer Material | One Color At A Time Uniform Contact | Print Head Size Nozzle Clogging |

Consequently, it can be seen that each imaging process will have its advantages and disadvantages.

Dye sublimation printing is named for the dyes used—these dyes will enter the gas phase at elevated temperature, and so become very mobile. When adjacent to a material in which they are very soluble, the dyes will migrate there. For example, polyester at 350° F., above its glass transition temperature, is an excellent receptor for these dyes. Articles made from or coated with polyester, polyamides and similar polymers, can be imaged by dye sublimation. The imaging is carried out by first printing the image in mirror form onto a donor or transfer sheet, usually paper, laying the paper on to the polyester layer, then pressing the sandwich at elevated temperature for a suitable time. An example of the process conditions typically used for imaging hot rigid substrates is 30 to 60 seconds at 400° F. at 10 psi.

Typical conditions for dye sublimation imaging hot rigid substrates are 20 to 60 seconds, 400° F., 10 psi. There are three primary processes for the transfer: flat bed, continuous belt and rotary presses. The flat bed press is used solely for piece goods, both flexible and rigid. Continuous belt presses, such as described below in reference to FIGS. 3A and 4B, may be used for both piece and web goods. They are particularly suited for piece goods being imaged from web transfer paper. Rotary presses are suitable only for flexible substrates whether piece or continuous. In the flat bed press, such as described below in reference to FIG. 4A, the sandwich of the substrate and the printed transfer paper is placed between the platens of the press. The top platen is always heated—the bottom may be also, and is typically heated when the substrate is prone to warpage from uneven top and bottom heating. It may also assist with the rate of dye transfer. The press is closed for the required duration and the transfer proceeds. On opening the paper is removed from the substrate and the substrate from the press. Presses are typically loaded and unloaded manually, although automated systems are available. The continuous belt press comprises two endless belts each rotating about two rollers. The belts are mounted so that one is directly above the other, and the top of the lower belt is in close proximity to the bottom of the belt. The two belts are driven in opposite rotation so that where they meet they run together. Pressure is applied to the belts in the area between the drive rolls by pads or rollers. The rollers and the pressure device may also apply heat, or the whole assembly may be heated. Image transfer is affected by passing the sandwich of the printed transfer paper and the substrate through the press. Both piece goods and continuous webs may be processed. Loading and unloading are typically automatic. Belt presses are preferred for high volume production.

Figure 3A:
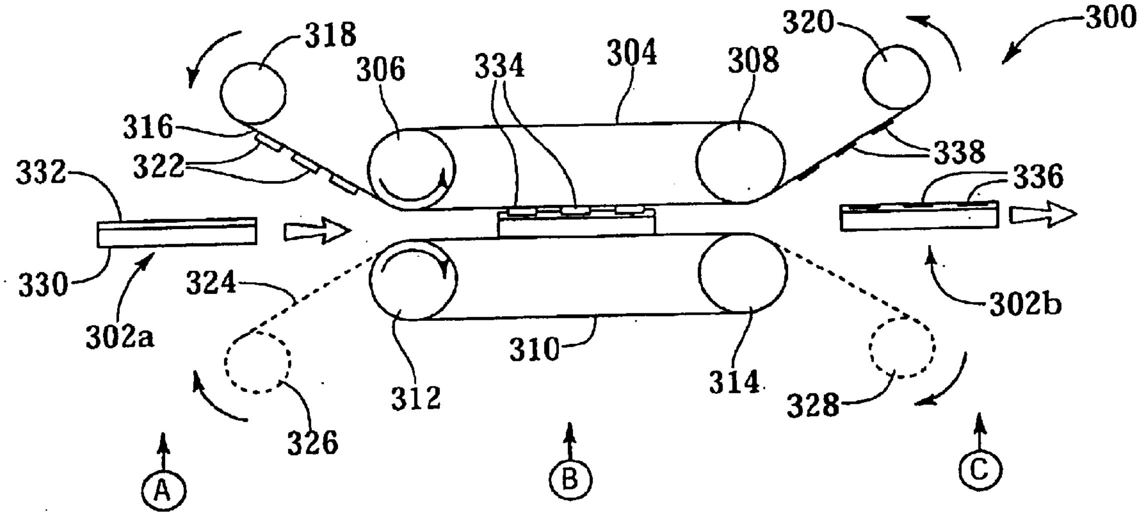
FIG. 3A illustrates a dye sublimation process for substantially flat substrates in accordance with the present invention.

Referring now to FIG. 3A, a dye sublimation process 300 for substantially flat substrates 302 in accordance with the present invention is shown. The process includes a continuous belt press having an upper endless metal belt 304 wrapped around first and second upper hot rollers 306 and 308, and a lower endless metal belt 310 wrapped around first and second lower rollers 312 and 314, all of which are contained within an oven (not shown). The first and second lower rollers 312 and 314 may or may not be heated to a small degree, so that a realistic finish is achieved when the edges and ends of a substrate are also receptor coated and imaged. Indeed this attribute distinguishes this invention from both veneer and lamination, which must show edge joints. A donor or transfer material 316 is unwound from a supply roll 318, transported through the oven via contact with the upper endless metal belt 304 and rewound on take up roll 320. The donor or transfer material 316 is a paper, fabric, PET film or other suitable medium in either sheet (good for pictures) or web (good for continuous repeating patterns) form containing dyes 322 representing the images to be transferred. Web offset printed paper or transfer material 316 offers pictures on a web and may be preferred for certain high volume applications. In addition, there are a variety of digital and traditional processes for the initial printing of the transfer material 316.

Registration of the image on the substrate 302 is a frequent requirement. For this, the transfer material 316 is typically provided with registration marks that can be distinguished by automated systems and used to control the position of the transfer material 316 relative to the substrate 302. Such systems are available and well known. The pattern-repeat distance on continuous pattern transfer material 316 is typically different from the dimensions of the substrate 302. At the operator's option, the registration can be adjusted so that the images on all substrates 302 are identical, or the registration can be staggered or randomized so there is continual variability in the placement of the pattern on the substrates 302. In particular, processing the substrate 302 so that the short edge is parallel to the chain direction may ensure that where the repeat distance is long, there is no visible repeating pattern of the image on the substrate 302. This is considered advantageous for the production of wood grain and other natural patterns. The availability of digitally printed dye sublimation transfer material 316 allows short runs, demonstrations, prototype manufacture and proofing using this process to be relatively inexpensive. Yet, because the transfer material 316 can also be printed by flexography, gravure or offset it is also very economical for very large production runs. If two sided imaging is desired, a second donor or transfer material 324 is unwound from a supply roll 326, transported through the oven via contact with the lower endless metal belt 310 and rewound on take up roll 328. In this case, the first and second lower rollers 312 and 314 should be heated.

The wood or wood composite substrate 302*a*, which comprises at least a base substrate 330 and receptor coat 332, enters the image process 300 at point A. As the substrate passes though the image process 300, the donor or transfer material 316 is heated and pressed against the receptor coat 332 by the upper endless metal belt 304 wrapped and the first and second upper hot rollers 306 and 308. The lower endless metal belt 310 and the first and second lower rollers 312 and 314 maintain pressure against the base substrate 330. Good contact between the transfer material 316 and the receptor coating surface 332 is required, which may be difficult to achieve if the surface is rough or aged. At point B, the dye 322 is transferred to and permeates the receptor coat 332 in gaseous form 334. At point C, the wood or wood composite substrate 302*b* exits the process having an image 336 within the receptor coat 332. Residual dye components 338 remain on the donor or transfer material 316.

The dye sublimation process 300 produces images that are very vivid and crisp. In addition, the image adds no real thickness and does not stand above the surface, which is a deficiency of direct printing. As a result, the surface is usually little changed by the imaging process. The gamut is wide and the selection of graphics is extremely broad. This image transfer process can be used to transfer images to both the top and bottom of horizontal wood or wood composite substrate at same time. In addition, both sides at can be done at one time, and both ends can be done at another time. As a result, putting separate images on all these surfaces will make a more realistic wood imitation. The image can be applied cross-wise on the wood or wood composite substrate so that there will be no repeat pattern visible on any substrate. Staggering the start point will allow subsequent substrates to be different rather than duplicates. Note that the image can wrap edges and ends to a small degree.

For example, the printed transfer paper or material 316 is normally wider than the substrate 302 to be imaged. When using either dye sublimation or ink transfer (FIG. 5), the excess width may be chosen so that it is greater than the depth of the side of the substrate 302. The transfer material 316 can, therefore, be wrapped around the side and processed in a like manner to the first surface so that the image is transferred onto the sides of the substrate 302. In this way, three of the six faces of a substrate 302 can be imaged in one process sequence. Should the two primary faces of a substrate 302 need to be imaged, then the sealer (if any) and receptor coating 332 should be applied to both faces. The image is then transferred to the first face by the method selected from those described herein, the substrate 302 is flipped and the second surface imaged by whichever method is most appropriate for the second face. The substrate 302 then moves on to top coating. If four of the six faces of the substrate 302 are to be imaged, then a sequence of imaging the first face, the first two sides, flipping the substrate 302 and then imaging the final face can be followed. If required, the substrate 302 can be rotated through 90 degrees so that the ends can be imaged by a similar process. The substrate then moves on to top coating.

If the substrates are moved with the short edge parallel to the chain direction, there need be no repeating pattern visible on any part as long as it is sufficiently small, such as 36 inches. Changing the register of the print on the board can be used to make each top a little bit different in appearance. Short runs, demonstration, prototype manufacture and proofing using this process are relatively inexpensive. Note that the relatively long dwell time required for the diffusion of the dye 322 from the transfer material 316 into the receptor coat 332 makes continuous belt transfer presses preferable for large volume production of large items as contemplated in this invention. Alternatively, flat bed presses with automated loading and unloading may also be used for high volume production if they operate at very high pressure so that the rate of diffusion of the dye 322 is accelerated.

To ensure a good quality image, the receptor coat should be made of polyester, polyamide or coated with polyester, polyamide or a similar material. Formulations that accept disperse dyes are well known. The dye sublimation process 300 allows the use of receptor coat formulations that function at 300 to 350° F., rather than 400° F. if the ink on the transfer material 316 and the press conditions are optimized. Such formulations tend to be soft and tacky, or in the so-called gel state. Often the receptor coat 332 is incompletely or only partially cured. Typically, the transfer material 316 will become irreversibly bonded to the receptor coat 332 during the image transfer press step. This may be prevented by laying a very thin film of, polyethylene for example, on the surface of the receptor coat 332 before the image is transferred. The film is removed after the image transfer with the used transfer material 316. Alternatively the ink layer 332 on the printed transfer material 316 can be over coated with a thin layer of film forming material that also allows the sublimation dye to pass through, but which will not itself adhere to the receptor coat 332 in its gel or soft state. Moreover, the substrate and coatings must stand high temperatures for extended times. The process is also relatively slow compared to some of the other image processes. Metallic colors do not reproduce very well using this process. Furthermore, disperse dyes, are sensitive to UV induced fade. Note that the image properties are not all discernible on the transfer paper—transfer onto the receptor of choice is necessary.

Figure 3B:
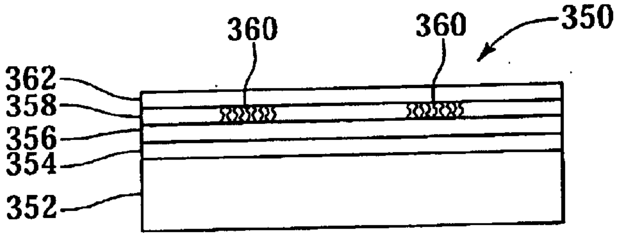
FIG. 3B illustrates a cross sectional view of a product produced by the dye sublimation process of FIG. 3A in accordance with the present invention.

Now referring to FIG. 3B, a cross sectional view of a product 350 produced by the dye sublimation process 300 of FIG. 3A in accordance with the present invention is shown. The finished product 350 includes a base wood or wood composite substrate 352 that has a layer of stain 354 on the top surface of the substrate 352 and a layer of sealant 356 on the top surface of the stain layer 354 and the sealant layer 356 are optional layers applied during the substrate prefinishing process 206 (FIG. 2). The receptor coat 358 is applied to the top surface of the sealant layer 354 during the receptor coating process 210 (FIG. 2). As described in reference to FIG. 3A, the dyes 360 forming the desired image are within the receptor coat 358. The topcoat 362 is then applied on the top surface of the receptor coat 362 during the top coating process 214 (FIG. 2). The receptor coat 358, dyes 360 and topcoat 362 are required for the present invention. Although reference is made to the top surface of the various layers, the applicable surface is any portion of the base substrate 352 on which an image is to be transferred. In other words "top surface" could actually refer to the top, bottom, sides, ends or other surface of the base substrate 352. In addition, the layers described above may apply to some or all surfaces of the base substrate 352.

Figure 4C:
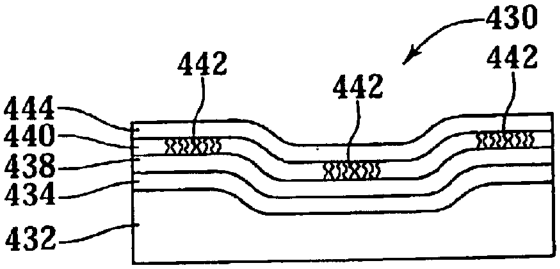
FIG. 4C illustrates a cross sectional view of a product produced by the dye sublimation process of FIGS. 4A and 4B in accordance with the present invention.
Figure 4A:
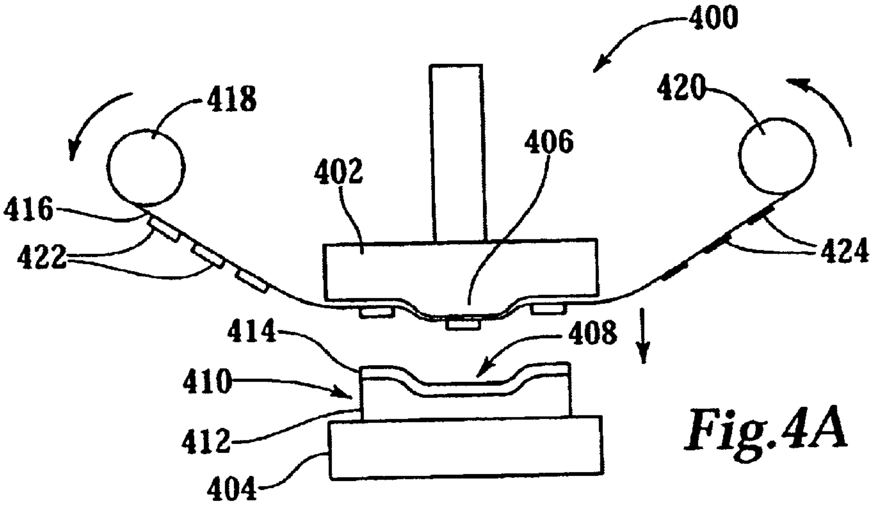
FIGS. 4A and 4B illustrate dye sublimation processes for non-flat substrates in accordance with the present invention.
Figure 4B:
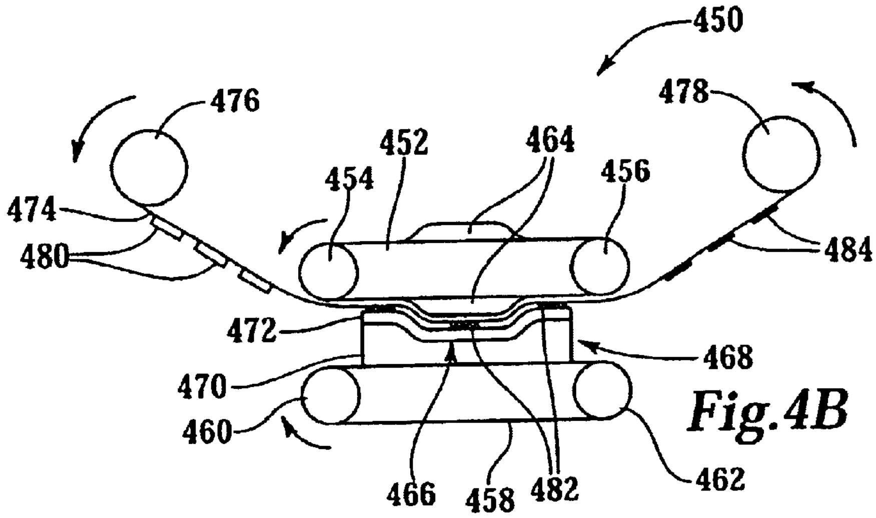

Referring now to FIGS. 4A and 4B, dye sublimation processes 400 and 450 for non-flat substrates 410 and 468 in accordance with the present invention is shown. Non-flat substrates 410 and 468 can be separated into two categories—those with consistent cross-sections in the direction of process flow, such as moldings and trims, and those with cross-sections that vary in both the direction of process flow, and across the direction of process flow, such as panel doors and routed drawer fronts. As shown in FIG. 4A, an image can be produced by process 400, which includes a flat bed press having a heated top platen 402 and a bottom platen 402. The top platen 402 is substantially planar except for a long stationary transfer nip, protrusion or reverse impression 406. The transfer nip 406 is a long heated molded plate that conforms in cross-section closely to the cross-section of the substrate 410 (including recess 408). The top platen 402 and transfer nip 406 are preferably, but not necessarily, coated with a non-stick material, such as Teflon®, to allow the non-flat substrate 410 to move smoothly.

The non-flat substrate 410 includes base substrate 412 and receptor coat 414. The recess 408 can be any multi-dimensional surface, such as moldings or trims, as long as proper contact and pressure can be maintained to transfer the image. Moreover, the term recess can included multi-dimensional surfaces that extend above the "main" surface of the substrate 410. A donor or transfer material 416 is unwound from a supply roll 418, transported along the upper platen 402 and rewound on take up roll 420. The donor or transfer material 416 is a paper, fabric, PET film, or other suitable medium in either sheet (good for pictures) or web (good for repeating patterns) form containing dyes 422 representing the images to be transferred. Note that the type of transfer material 416 will depend greatly on the complexity of the recess 408 and the image to be transferred. It may be advantageous to use a treated transfer material 416 so that its side in contact with the top platen 402 contains slip and non-stick agents. Such materials are well known. When the substrate 410 has a consistent cross-section in the longitudinal direction, paper is the preferred transfer material 416 because it is not required to, and preferably should not, stretch. As a result, paper will not be a good transfer material 416 for most three-dimensional recesses 408.

Once the substrate 410 is properly positioned within the press, the top platen 402 descends and forces the transfer material 416 into contact with the receptor coat 414 to transfer the image at specific time, temperature, and pressure. The dye 422 is transferred to and permeates the receptor coat 420 in gaseous form. Residual dye components 424 remain on the donor or transfer material 416. On exiting the transfer zone the transfer material 416 is removed by mechanical or vacuum means. It may be advantageous to slit the transfer material 416 and use two or more removal flows for higher process efficiency. The substrate 410 at this point is imaged and ready for top coating.

With respect to FIG. 4B, the process 450 includes a Hymmen press having an upper endless metal belt 452 wrapped around first and second upper hot rollers 454 and 456, and a lower endless metal belt 458 wrapped around first and second lower rollers 460 and 462, all of which are contained within an oven (not shown). The first and second lower rollers 460 and 462 may or not be heated. The upper endless metal belt includes one or more protrusions or reverse impressions 464 that are designed to mate with the recess 466 in the non-flat substrate 468. The non-flat substrate 468 includes both substrate 470 and receptor coat 472. The recess 466 can be any multi-dimensional surface, such as moldings, routing, or insets, as long as proper contact and pressure can be maintained to transfer the image. Moreover, the term recess can include multi-dimensional surfaces that extend above the "main" surface of the substrate 468. A donor or transfer material 474 is unwound from a supply roll 476, transported through the oven via contact with the upper endless metal belt 452 and rewound on take up roll 478. The donor or transfer material 474 is a paper, fabric, PET film or other suitable medium in either sheet (good for pictures) or web (good for repeating patterns) form containing dyes 480 representing the images to be transferred. As described in reference to FIG. 3A, two sided imaging can be accomplished using a second donor or transfer material (not shown) and the lower endless metal belt 458, and first and second lower rollers 460 and 462. In addition, the actual image transfer mechanism is the same as described in reference to FIG. 3A, including dyes 482 in gaseous form and residual dye components 484.

Alternatively, the upper endless belt can be replaced with a device, which ensures proper transfer material to receptor coating contact for the required dwell at a suitable pressure and temperature. The device may include one or more rollers shaped to match the profile of the substrate being imaged and operating at suitable pressure and temperature. The additional steps required to ensure the transfer material conforms to the substrate contours are preferentially completed before the high temperature transfer step begins. A continuous web transfer material works especially well for this process. The transfer material is unwound from the supply roll and fed through a series of angled compliant rollers so that its shape is gradually brought to match that of the substrate cross-sectional topography. An extended series of rolls is preferred when the features of the substrate are deep and/or steep, so that the transfer material is molded to the substrate in a series of small steps. This avoids creasing or wrinkling. When the transfer material is properly fitted to the substrate, the resulting sandwich can then be pressed by the molded platen of a stationery press as shown FIG. 4A, or by a continuous transfer press as shown in FIG. 4B, so that the ink adheres permanently to the receptor coating. A radiant or hot air heater may be applied to the back of transfer material before the transfer roll to aid in heating the ink to the preferred operating temperature. When the substrate has a consistent cross-section in the longitudinal direction, paper is the preferred transfer material because it is not required to, and preferably should not, stretch. On exiting the transfer zone the transfer material is removed by mechanical or vacuum means. It may be advantageous to slit the transfer material and use two or more removal flows for higher process efficiency. The substrate at this point is imaged and ready for top-coating.

When the substrate cross-section varies both in the direction of process flow, and across the direction of process flow, the dye sublimation transfer process again requires that the transfer material be matched with the substrate to form a sandwich prior to the transfer. The matching requires the transfer material to take on a three-dimensional shape, which in turn requires it to stretch and/or shrink to conform. A transfer material derived from cellulosic materials is generally unsuited for this use as it lacks suitable stretch. Transfer materials derived from plastic materials such as polyolefins and polyesters are preferred, whether in film or fibrous form. This matching to form the sandwich is accomplished with a top platen, or series of top platens, that closely fits the shape of the substrate. When there is only one platen and it also functions as the heated platen which effects the conditions for dye sublimation transfer, that is, a dwell at 300 to 400° F., 20 to 60 sec and 5 to 100 psi. Alternatively, and preferably, the conforming is effected by a first platen or a first series of platens that operates at a temperature and pressure sufficient to mold the transfer material to the shape of the substrate yet not initiate transfer. When the transfer material is a polyolefin this may occur at temperatures between 200 and 300° F. The sandwich of transfer material and substrate then is inserted or drawn into the press where there is a top platen which presses the transfer material to the substrate under the conditions preferred for dye sublimation transfer, 300 to 400° F., 20 to 60 seconds and 5 to 50 psi. After this the sandwich is removed from the press, the spent transfer material is removed and the object is ready to move to the next stage, typically top coating.

When pressing objects with variable topography, removal of the air between the transfer material and the receptor coat becomes more difficult. While it may be considered advantageous to use a porous transfer material carrier, this approach tends to contaminate the platen with dye that may interfere with subsequent images, especially if the pattern in use is not being repeated in tight registration. The steps in bringing the transfer material into close conformation with the non-planar surface of the substrate are, therefore, chosen so that air is expelled and not trapped. Such a pre-application system may be a relatively soft compliant platen, or it may be a series of compliant platens, shaped so that air is steadily squeezed out. Alternatively, the pre-application system may be in the form of a roll or series of rolls that progressively squeezes out the air. When a pre-application system is not used, the top platen may comprise a relatively conformable material, such as a silicone rubber shaped so that contact is made in a way that does not trap air, or it may be a flexible platen attached to a belt so that the air is sequentially squeezed from between the transfer material and the receptor coating of the substrate. Note that an electrostatic charge can be used to assist adhering the image transfer material web to the substrate—the two are charged oppositely by ionized air or similar charging device.

As will be appreciated by those skilled in the art, the size and shape of the contours of the substrate affect both the speed at which the substrate can be processed and the quality of the transferred image. For example, grooves with walls at low angle to the plane of the top surface can be processed readily, but those with steep walls are more difficult. Similarly, angles and corners that are rounded process more readily than those that are square or sharp. The balance between design and process efficiency will in large part dictate which of the above described image transfer methods are acceptable for a given project.

Now referring to FIG. 4C, a cross sectional view of a product 430 produced by the dye sublimation processes 400 and 450 of FIGS. 4A and 4B in accordance with the present invention is shown. The finished product 430 includes a base wood or wood composite substrate 432 having a recess 434, which can be any multidimensional surface, such as moldings, routings or inserts, that are above or below the main surface of the base substrate 432. A layer of stain 436 is on the top surface of the base substrate 432 and a layer of sealant 438 is on the top surface of the stain layer 436. Note that the stain layer 436 and the sealant layer 438 are optional layers applied during the substrate pre-finishing process 206 (FIG. 2). The receptor coat 440 is applied to the top surface of the sealant layer 438 during the receptor coating process 210 (FIG. 2). As described in reference to FIG. 3A, the dyes 442 forming the desired image are within the receptor coat 440. The topcoat 442 is then applied on the top surface of the receptor coat 440 during the top coating process 214 (FIG. 2). The receptor coat 440, dyes 442 and topcoat 444 are required for the present invention. Although reference is made to the top surface of the various layers, the applicable surface is any portion of the base substrate 432 on which an image is to be transferred. In other words, "top surface" could actually refer to the top, bottom, sides, ends or other surface of the base substrate 432. In addition, the layers described above may apply to some or all surfaces of the base substrate 432.

Figure 5:
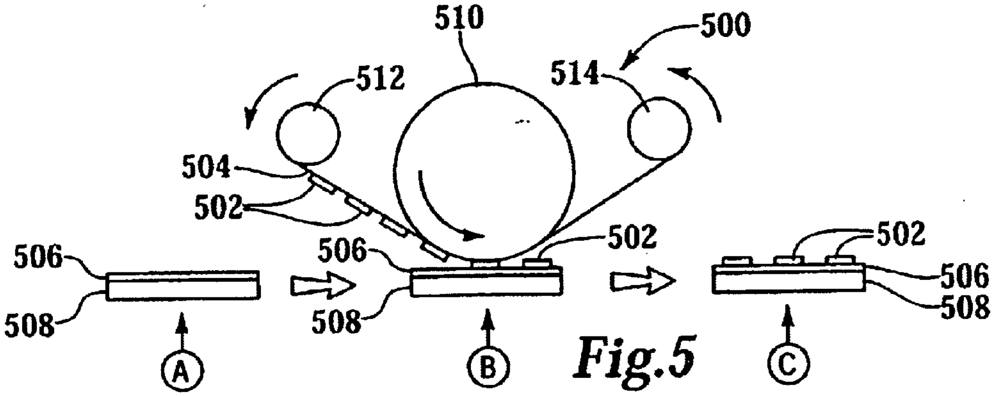
FIG. 5 illustrates an ink transfer process in accordance with the present invention.

Referring now to FIG. 5, an ink transfer process 500 in accordance with the present invention is shown. In the ink transfer process 500, all the ink 502 is transferred from the transfer material 504 to the receptor coat 506 by hot lamination. More specifically, the wood or wood composite substrate 508 enters the process 500 at point A. At point B, ink 502 is transferred from the transfer material 504 to the receptor coat 506 by means of a heated roller 510 that applies sufficient pressure to transfer material 504 and receptor coat 506 to cause the ink 502 to transfer to the receptor coat 506. The transfer material 504 is unwound from a supply roll 512, transported across roller 510 and rewound on take up roll 514. At point C, the image formed by inks 502 has been transferred to the receptor coat 506 of substrate 508.

Transfer materials 504 suitable for saturation may be printed by traditional analog means (gravure or flexography) as well as now by digital processes (e.g., ink jet) so the advantages of each process can be considered in determining that which is most appropriate for any situation. A clear coating may also be transferred from the transfer material 504 to give a wear coat or a coating for later staining. The wear coat will be sufficiently durable to ensure the image is not damaged during subsequent processing or transportation, yet be amenable to over-coating with a highly durable topcoat. Either a plastic film or a paper may be used as the transfer material 504 to carry the transfer image. Paper is preferred for economy. It is important that the transfer material 504 be processed without wrinkles or creases. The means to achieve this have been previously described. The transfer material 504 has a release surface which has sufficient adhesion to hold the ink during manufacture and processing, yet sufficient release to allow complete transfer of the image when the ink is firmly bonded to the receptor coat 506 during the image transfer step. Such transfer materials 504 are said to have "tight release" and are well known to those familiar with the art.

This process provides good resolution, crisp images, a very large color gamut and true metallic colors. In addition, any heat stable colorant can be used. For example, if the colorants typically chosen for automotive and exterior building paints are selected, the finished article can be used for extended long term outdoor applications. Ink transfer also allows the designer to select both opaque and transparent inks. Thus, an opaque white ink may be used as background for a pattern when it is not desired to have a fully white substrate. This can obviate the need to apply an opaque white base coat which can be used to advantage for cost or design purposes, for example when a picture is desired over a part of a simulated wood grain surface. A further advantage is that the transfer material 504 for the ink is itself a release sheet. Therefore, it will not adhere to a gel, soft or partially cured receptor coating and so the method may be used to image or decorate surfaces with such characteristics. Ink transfer is typically applied with a rubber covered roll 510, which extends the image a small distance around corners of small radius. Thus, if two adjacent surfaces are imaged, the pattern need not show a seam or joint, and this advantageously differentiates this process from veneer or lamination. The image can wrap edges and ends and is thin—seldom more than 0.5 mils. Moreover, this process 500 only requires moderate processing conditions (from room temperature to 300° F. depending on the materials used). The process 500 is readily processed at moderate speed on roll transfer equipment.

Ink transfer typically is processed at what are considered moderate conditions—typically 200 to 300° F., and at speeds up to 100 fpm. It is, therefore, not stressful on most of the substrate compositions contemplated in this invention. Nevertheless, steps such as differential heating from top to bottom may be required to ensure flatness and stability of the substrate 508. The transfer material 504 for ink transfer imaging can be prepared by digital means such as ink jet or electrography (in which case the toner functions identically to ink). Thus proofs, prototypes, demonstration articles and short runs can all be produced economically.

Figure 6:
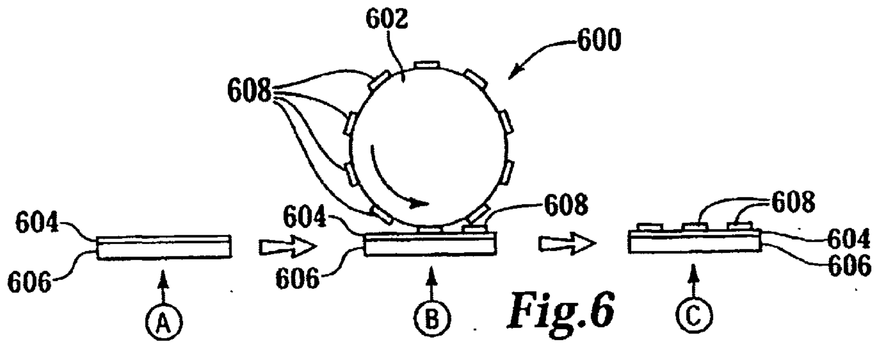
FIG. 6 illustrates a direct printing process in accordance with the present invention.

Now referring to FIG. 6, a direct printing process 600 in accordance with the present invention is shown. In the direct printing by contact process 600 (e.g., flexography or gravure), the image is from a roll 602 to the receptor coat 604. Gravure printing uses a hard metal surfaced roll and has the advantages of high life and high resolution graphics. However, the hard roll is unforgiving of variations in the thickness of planarity of the substrate and so is prone to misses and gaps. Flexography uses rubber rolls for the transfer and so is less susceptible to the consequences of slight substrate deformation. However, it is more likely to demonstrate wear from extended use. More specifically, the wood or wood composite substrate 606 enters the process 600 at point A. At point B, ink 608 is transferred from the roller 602 to the receptor coat 604 by direct contact. At point C, the image formed by inks 608 has been transferred to the receptor coat 604 of substrate 606.

Figure 7:
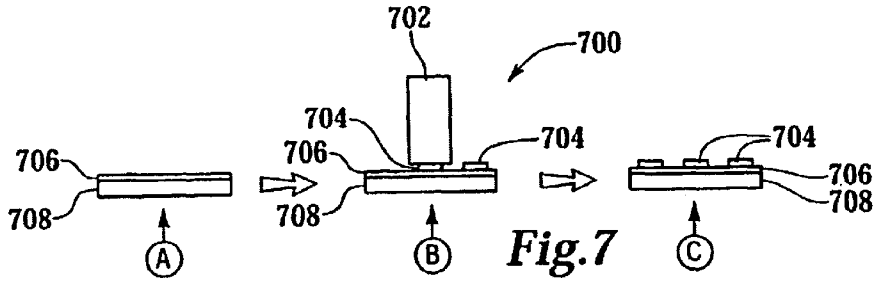
FIG. 7 illustrates a non-contact ink transfer process in accordance with the present invention.

Referring now to FIG. 7, a non-contact ink transfer process 700 in accordance with the present invention is shown. In the non-contact image transfer process 700 (e.g., inkjet), a large number of nozzles contained in a print head 702 that transfer ink 704 directly to the receptor coat 706.

More specifically, the wood or wood composite substrate 708 enters the process 700 at point A. At point B, ink 704 is transferred from the print head 702 to the receptor coat 706. At point C, the image formed by inks 704 has been transferred to the receptor coat 706 of substrate 708. Note that this process 700 does not work well with non-planer surfaces and tends to slow relative to the other processes. Nozzle problems may also occur from time to time. Nevertheless, ink jet printing will be the preferred process for select applications. In particular it will be chosen when a small amount of variable data or imagery is to be added to an otherwise repeating image. It may therefore be used in conjunction with any of the above-mentioned imaging methods.

Figure 8:
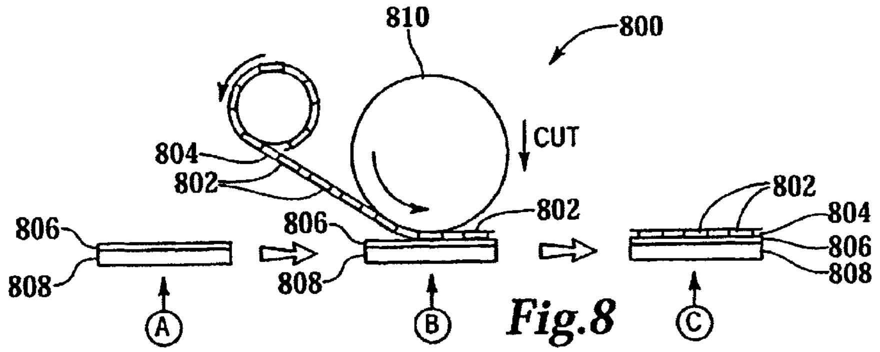
FIG. 8 illustrates a lamination transfer process in accordance with the present invention.

Now referring to FIG. 8, a lamination transfer process 800 in accordance with the present invention is shown. In the lamination image transfer process 800, the laminates are typically produced by first printing the image 802 directly on to the face of a special grade of paper called saturating paper 804, then saturating the paper with the liquid form of the polymer used for the laminate, laying the paper on the substrate, and then curing the sandwich. A suitably saturated paper 804 can be laminated onto the gel formed from partial cure of the receptor coat 806 and the topcoat prior to final curing. More specifically, the wood or wood composite substrate 808 enters the process 800 at point A. At point B, the saturating paper 804 is transferred from the roller 810 to the receptor coat 804 by direct contact. The saturating paper 804 is then cut to fit the substrate 808. At point C, the saturating paper 804 containing the image 802 has been transferred to the receptor coat 806 of substrate 608. Note that since a layer of paper applied to the wood or wood composite substrate 808, edge effect can occur unless the paper is applied full width. In addition, the saturating paper 804 inherently has a lower resolution than some of the other image transfer processes.

Figure 9A:
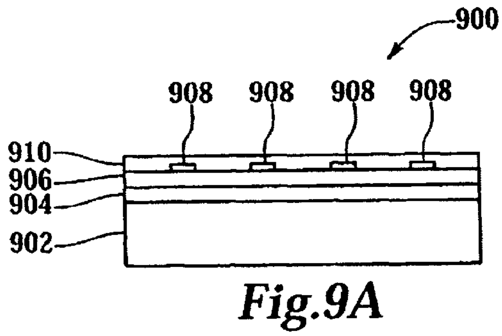
FIGS. 9A and 9B illustrate cross sectional views of a product produced by an ink transfer, lamination, direct transfer or non-contact transfer process in accordance with the present invention.
Figure 9B:
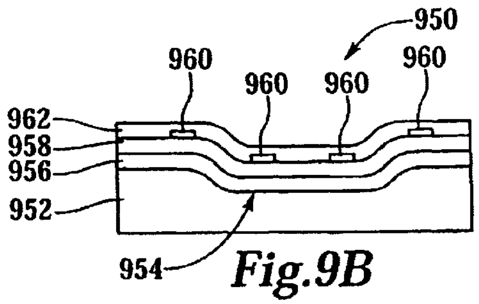

Referring now to FIGS. 9A and 9B, cross sectional views of a product 900 and 950 produced by a ink transfer, lamination, direct transfer or non-contact transfer process in accordance with the present invention are shown. The finished product 900 includes a base wood or wood composite substrate 902 that has a layer of sealant 904 on the top surface of the substrate 902. The sealant layer 904 is an optional layer applied during the substrate pre-finishing process 206 (FIG. 2). The receptor coat 906 is applied to the top surface of the sealant layer 904 during the receptor coating process 210 (FIG. 2). As described in reference to FIGS. 5, 6, 7 and 8, the inks 908 forming the desired image are on top of the receptor coat 906. The topcoat 910 is then applied on the top surface of the receptor coat 906 during the top coating process 214 (FIG. 2). The receptor coat 906, inks 908 and topcoat 910 are required for the present invention. Although reference is made to the top surface of the various layers, the applicable surface is any portion of the base substrate 902 on which an image is to be transferred. In other words "top surface" could actually refer to the top, bottom, sides, ends or other surface of the base substrate 902. In addition, the layers described above may apply to some or all surfaces of the base substrate 902.

The finished product 950 includes a base wood or wood composite substrate 952 having a recess 954, which can be any multidimensional surface, such as moldings, routings or inserts, that are above or below the main surface of the base substrate 952. A layer of sealant 956 is on the top surface of the substrate 952. Note that the sealant layer 956 is an optional layer applied during the substrate pre-finishing process 206 (FIG. 2). The receptor coat 958 is applied to the top surface of the sealant layer 956 during the receptor coating process 210 (FIG. 2). As described in reference to FIG. 3A, the inks 960 forming the desired image are on top of the receptor coat 958. The topcoat 960 is then applied on the top surface of the receptor coat 958 during the top coating process 214 (FIG. 2). The receptor coat 958, inks 960 and topcoat 962 are required for the present invention. Although reference is made to the top surface of the various layers, the applicable surface is any portion of the base substrate 952 on which an image is to be transferred. In other words, "top surface" could actually refer to the top, bottom, sides, ends or other surface of the base substrate 952. In addition, the layers described above may apply to some or all surfaces of the base substrate 952.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for producing an image on one or more surfaces of a wood or wood composite substrate, comprising the steps of:

applying a receptor coat of powder to at least the one or more surfaces of the substrate;

partially curing the powder to adhere to the substrate and to prevent flow during subsequent processing steps;

transferring the image to the receptor coat after partially curing the powder;

applying the topcoat to the image and receptor coat; and curing the receptor coat, image and topcoat.

2. The method as recited in claim 1, wherein the substrate is a panel, door, a table top, or a countertop.

3. The method as recited in claim 1, wherein the image is transferred to the receptor coat immediately after partially curing the powder.

4. The method as recited in claim 2, wherein the image is transferred to the receptor coat while the substrate/receptor coat are still in a heated state from the partial curing of the powder.

5. The method as recited in claim 1, further comprising the steps of transporting the substrate/receptor coat directly from a station where the powder was partially cured to a station where the image is transferred.

6. The method as recited in claim 1, wherein the one or more surfaces of the substrate are substantially planar.

7. The method as recited in claim 1, wherein a cross section of the one or more surfaces of the substrate varies in one dimension.

8. The method as recited in claim 1, wherein a cross section of the one or more surfaces of the substrate varies in two dimensions.

9. The method as recited in claim 1, further comprising the step of preparing the one or more surfaces of the substrate.

10. The method as recited in claim 9, wherein the step of preparing the one or more surfaces of the substrate includes shaping, edging, forming, routing, drilling, creating hardware recesses, sanding or cutting of the substrate.

11. The method as recited in claim 1, further comprising the step of pro-finishing the one or more surfaces of the substrate.

12. The method as recited in claim 11, wherein the step of pre-finishing the one or more surfaces of the substrate includes cleaning, polishing, sanding, sealing, staining or fillcoating the substrate.

13. The method as recited in claim 1, further comprising the step of cleaning the one or more surfaces of the substrate.

14. The method as recited in claim 1, wherein the image is transferred to the receptor coat using a dye sublimation process.

15. The method as recited in claim 1, wherein the image is transferred to the receptor coat using an ink transfer process.

16. The method as recited in claim 1, wherein the image is transferred to the receptor coat using a direct printing process.

17. The method as recited in claim 1, wherein the image is transferred to the receptor coat using a non-contact ink transfer process.

18. The method as recited in claim 1, wherein the image is transferred to the receptor coat using a lamination transfer process.

19. The method as recited in claim 1, wherein the image is transferred to the receptor coat before the substrate/receptor coated is cooled down.

20. The method as recited in claim 1, wherein the image is transferred to the receptor coat using a transfer material containing one or more inks or dyes.

21. The method as recited in claim 20, wherein the transfer material is a fabric, a polyester film, a polyvinyl film, a polyethylene film or a web.

22. The method as recited in claim 20, wherein the transfer material is a paper or a polyolefin film.

23. The method as recited in claim 20, wherein the partially cured receptor coat is tacky and the transfer material includes a film to prevent the transfer material from sticking to the receptor coat.

24. The method as recited in claim 23, wherein the film is a polyethylene film.

25. The method as recited in claim 20, further comprising the step of applying a film to the partially cured receptor coat that is subsequently removed with the transfer material to prevent the transfer material from sticking to the receptor coat.

26. The method as recited in claim 25, wherein the film is a polyethylene film.

27. The method as recited in claim 1, wherein the image transfer step is performed at a temperature of between 200° F. and 400° F.

28. The method as recited in claim 1, wherein the image transfer step is performed at a temperature of between 300° F. and 350° F.

29. The method as recited in claim 1, wherein the image transfer step is performed at a temperature of between 200° F. and 300° F.

30. The method as recited in claim 17, wherein the non-contact ink transfer process is a flexology process.

31. The method as recited in claim 1, wherein the receptor coat, image and topcoat are applied to two or more surfaces of the substrate.

32. The method as recited in claim 31, wherein the two or more surfaces include a top and two or more sides of the substrate.

33. A method for producing an image on one or more surfaces of a wood or wood composite substrate, comprising the steps of:

applying a receptor coat to at least the one or more surfaces of the substrate;

partially curing the receptor coat to adhere to the substrate and to prevent flow during subsequent processing steps;

bringing a transfer material containing the image to be transferred in contact with the receptor coat after partially curing the receptor coat;

transferring the image to the receptor coat by applying heat and pressure to the transfer material to cause the ink of the image to adhere to the receptor coat;

applying a topcoat to the image and receptor coat; and curing the receptor coat, image and topcoat.

34. A method for producing an image on one or more surfaces of a wood or wood composite substrate, comprising the steps of:

applying a receptor coat to at least the one or more surfaces of the substrate;

partially curing the receptor coat to adhere to the substrate and prevent flow during subsequent processing steps;

transferring the image to the receptor coat using a direct printing process after partially curing the receptor coat;

applying a topcoat to the image and receptor coat; and curing the receptor coat, image and topcoat.

35. A method for producing an image on one or more surfaces of a wood or wood composite substrate, comprising the steps of:

applying a receptor coat to at least the one or more surfaces of the substrate;

partially curing the receptor coat to adhere to the substrate and to prevent flow during subsequent processing steps;

transferring the image to the receptor coat using a non-contact ink transfer process after partially curing the receptor coat; and applying a topcoat to the image and receptor coat; and curing the receptor coat, image and topcoat.

36. A method for producing an image on one or more surfaces of a wood or wood composite substrate, comprising the steps of:

applying a receptor coat to at least the one or more surfaces of the substrate;

transferring the image to the receptor coat using a lamination process after partially curing the receptor coat;

applying a topcoat to the image and receptor coat; and curing the receptor coat, image and topcoat.

* * * * *